United States Patent
Rouquette et al.

(10) Patent No.: US 7,038,613 B1
(45) Date of Patent: May 2, 2006

(54) METHOD AND DEVICE FOR DETERMINING AT LEAST ONE CUE OF VERTICAL POSITION OF AN AIRCRAFT

(75) Inventors: Patrice Rouquette, La Loubiere (FR); Eric Peyrucain, Saint Genies Bellevue (FR); Jacques Rosay, Toulouse (FR)

(73) Assignee: Airbus France, Toulouse (FR)

( * ) Notice: Subject to any disclaimer, the term of this patent is extended or adjusted under 35 U.S.C. 154(b) by 204 days.

(21) Appl. No.: 10/803,091

(22) Filed: Mar. 18, 2004

(30) Foreign Application Priority Data

Mar. 19, 2003 (FR) .................................. 03 03335

(51) Int. Cl.
*G01S 13/91* (2006.01)

(52) U.S. Cl. ............................ 342/33; 342/34; 342/35; 342/36

(58) Field of Classification Search ............ 342/33–39, 342/176, 179–185; 244/17.13, 181–188; 340/963, 972–980; 701/14, 16, 17
See application file for complete search history.

(56) References Cited

U.S. PATENT DOCUMENTS

| | | | | |
|---|---|---|---|---|
| 3,521,228 A | * | 7/1970 | Izumi et al. ................. | 340/973 |
| 3,697,022 A | | 10/1972 | Autechaud et al. ........ | 244/17.13 |
| 3,988,731 A | * | 10/1976 | Young .......................... | 342/179 |
| 3,999,007 A | * | 12/1976 | Crane .......................... | 348/123 |
| 4,004,758 A | * | 1/1977 | Boriss et al. ............. | 244/17.13 |
| 5,593,114 A | * | 1/1997 | Ruhl ........................... | 244/183 |
| 5,820,080 A | | 10/1998 | Eschenbach ................ | 244/183 |
| 6,111,526 A | * | 8/2000 | Aymeric et al. ............ | 340/972 |
| 2003/0132860 A1 | * | 7/2003 | Feyereisen et al. ......... | 340/973 |

FOREIGN PATENT DOCUMENTS

DE          3621052         1/1988

* cited by examiner

*Primary Examiner*—John B. Sotomayor
(74) *Attorney, Agent, or Firm*—Stevens, Davis, Miller & Mosher, LLP

(57) ABSTRACT

A method and device for determining a vertical position cue of an aircraft while landing in the presence of a lateral alignment beam, which is emitted from the ground and provides an indication of the aircraft's lateral alignment with respect to a landing strip, may include detecting the lateral alignment beam with aircraft equipment. On the basis of cues relating to the detected lateral alignment beam and of predetermined cues, an axis of approach of the aircraft is determined. Additionally, the actual position and a preset position of the aircraft, which corresponds to the position the aircraft would have if it were on the approach axis, are determined. On the basis of the actual and preset positions of the aircraft, the vertical deviation of the aircraft, representing the vertical position cue, is computed.

15 Claims, 3 Drawing Sheets

METHOD AND DEVICE FOR DETERMINING AT LEAST ONE CUE OF VERTICAL POSITION OF AN AIRCRAFT

FIELD OF THE INVENTION

The present invention relates to a method and a device for determining at least one cue of vertical position of an aircraft during landing thereof.

BACKGROUND OF THE RELATED ART

It is known that numerous airports are equipped with a ground-based radionavigation system emitting signals allowing instrument precision landing of the ILS ("Instrument Landing System") type of an aircraft, in particular of a civil transport plane, equipped with appropriate receivers.

Such a radionavigation system comprises ground stations that are situated at the strip verge and at least one specialized radioreceiver mounted aboard the aircraft, which provides horizontal and vertical guidance before and during landing by presenting the pilot with the lateral deviation with respect to an approach axis and the vertical deviation with respect to a descent plane. Said radionavigation system generally comprises, as ground stations:
  a directional UHF radiotransmitter, placed downstream of the strip threshold and on one side or the other of the axis of the strip, and intended to ensure vertical guidance along an approach axis according to an ideal plane of descent during an "ILS" approach, by virtue of the emission of an appropriate vertical guidance beam ("Glide" beam). More precisely, this radiotransmitter emits two signals with different modulation which are aligned one above the other and which overlap on the approach axis where the two signals are received with equal strength; and
  a directional VHF radiotransmitter, generally placed on the strip axis at the opposite end from the approach threshold, and intended to ensure azimuthal guidance along the approach axis according to an ideal lateral alignment profile during an "ILS" approach, by virtue of the emission of an appropriate lateral alignment beam ("Loc" beam). More precisely, this radiotransmitter emits two signals with different modulation which overlap on the approach axis where the two signals are received with equal strength.

Such a radionavigation system affords considerable and effective assistance with landing (through lateral guidance and vertical guidance), in particular through poor visibility (fog, etc.) or in the absence of visibility.

However, it may happen that such a radionavigation system is incomplete or at least partially faulty so that the pilot then no longer has access to all the information allowing completely assisted landing.

The present invention applies to the case where no "glide" beam (vertical guidance) is available, only a "loc" beam (lateral guidance) being detectable from the aircraft.

Such a case may occur in particular in the following situations:
  the radionavigation system comprises only means for emitting a "loc" beam;
  the means of said radionavigation system which are intended for emitting a "glide" beam are faulty;
  the radionavigation system emits a "glide" beam forward of the strip and "loc" beams forward, as well as rearward of the strip, and the landing is carried out from the rear.

When such a case occurs, the pilot must manage the vertical guidance without assistance. Such management requires a considerable workload and close attention on the part of the pilot, and this may sometimes increase the risk of errors and hence entail lesser flight safety than during an "ILS" type precision approach, for which, as indicated above, the pilot benefits in particular from assistance in respect of vertical guidance.

SUMMARY OF THE INVENTION

An object of the present invention is to remedy these drawbacks. It relates to a method of determining at least one cue of vertical position of an aircraft during landing thereof on a landing strip, in the presence only of a lateral alignment beam (that is to say of a "loc" beam) which is emitted from the ground and which gives an indication regarding the lateral alignment with respect to the approach axis, and hence in the absence of a detectable vertical guidance beam ("glide" beam).

For this purpose, according to the invention, said method is noteworthy in that:
a) said lateral alignment beam is detected on the aircraft;
b) on the basis of cues relating to said lateral alignment beam thus detected and of predetermined cues, an axis of approach of the aircraft is determined;
c) the actual position of the aircraft is determined;
d) a preset position of the aircraft is determined, which corresponds to the position that the aircraft would have if it were on said approach axis; and
e) on the basis of said actual position and of said preset position of the aircraft, the vertical deviation of the aircraft, which represents said vertical position cue, is computed.

Thus, by virtue of the invention, a cue of vertical position of the aircraft is obtained solely on the basis of a lateral alignment beam ("loc" beam), that is to say without using a vertical guidance beam ("glide" beam).

Advantageously, in step b), to determine said approach axis:
α) a set of first axes all passing through one and the same predetermined point situated on the ground at least in proximity to said landing strip and all exhibiting one and the same predetermined slope is formed; and
β) a first axis of said set of first axes, whose projection onto a horizontal plane is parallel to the projection onto this horizontal plane of said lateral alignment beam detected, is chosen as approach axis.

Furthermore, advantageously, in step c), the actual position of the aircraft is determined on the basis of values of longitude, of latitude and of altitude of the aircraft.

In a preferred embodiment, the value of altitude of the aircraft is obtained with the aid of at least one measurement carried out by at least one barometric probe.

In this case, in a first variant embodiment, the altitude value which is measured is corrected, as a function of the temperature on the ground.

Preferably, the altitude value Am measured is corrected with the aid of the following expression, to obtain a corrected altitude value Ac:

$$Ac = (Am - Ap).(T1/T2) + Ap$$

in which:
  Ap represents the altitude of the landing strip;
  T1 is the temperature on the ground; and
  T2 is a predetermined temperature value.

Advantageously, the altitude value is corrected only if the temperature on the ground is less than a predetermined temperature value.

In a second variant embodiment (which may be combined with said first variant embodiment described hereinabove, to provide the altitude value Am used in the altitude correction formula corresponding to said first variant), the altitude value measured is corrected if necessary in such a way as to obtain a corrected altitude value QNH which is referenced with respect to the level of the sea.

In this second variant, firstly, when the measured altitude value QFE is referenced with respect to the landing strip, it is corrected, with the aid of the following expression, to obtain the corrected altitude value QNH:

$$QNH=QFE+Ap,$$

in which Ap represents the altitude of the landing strip.

Furthermore, secondly, when the measured altitude value is a standard altitude STD, it is corrected, with the aid of the following expression, to obtain the corrected altitude value QNH:

$$QNH=STD+\Delta \text{ with } \Delta=QNHp-\beta,$$

QNHp being a value dependent on the atmospheric pressure at the level of the landing strip and $\beta$ being a predetermined value.

The present invention also relates to a method of guiding an aircraft during landing thereof on a landing strip, in the presence of a lateral alignment beam which is emitted from the ground and which gives an indication regarding the lateral alignment with respect to the landing strip.

According to the invention, this method is noteworthy in that the following series of successive operations is carried out repetitively up to landing:

A/ the abovementioned method is implemented to determine the vertical deviation of the aircraft;

B/ the lateral deviation of the aircraft with respect to said lateral alignment beam detected is determined; and C/ the aircraft is guided in such a way as to cancel out said vertical and lateral deviations.

Additionally, the present invention also relates to a device for determining at least one cue of vertical position of an aircraft during landing thereof on a landing strip, in the presence of a lateral alignment beam which is emitted from the ground and which gives an indication regarding the lateral alignment with respect to the landing strip. This device is noteworthy, according to the invention, in that it comprises:

a means of detection for detecting said lateral alignment beam on the aircraft;

a database comprising cues relating to landing on said landing strip;

a first means for determining an axis of approach of the aircraft, on the basis of cues relating to said lateral alignment beam that are received from said means of detection, and cues received from said database;

a second means for determining the actual position of the aircraft;

a third means for determining a preset position of the aircraft, which corresponds to the position that the aircraft would have if it were on said approach axis; and a fourth means for computing, on the basis of said actual position and of said preset position of the aircraft, the vertical deviation of the aircraft, representing said vertical position cue.

Preferably, said first and second means form part of one and the same computation unit. Preferably also, said third and fourth means form part of one and the same computation unit.

BRIEF DESCRIPTION OF THE DRAWINGS

The figures of the appended drawing will elucidate the manner in which the invention may be embodied. In these figures, identical references designate similar elements.

DETAILED DESCRIPTION OF EMBODIMENTS

Figure 1:
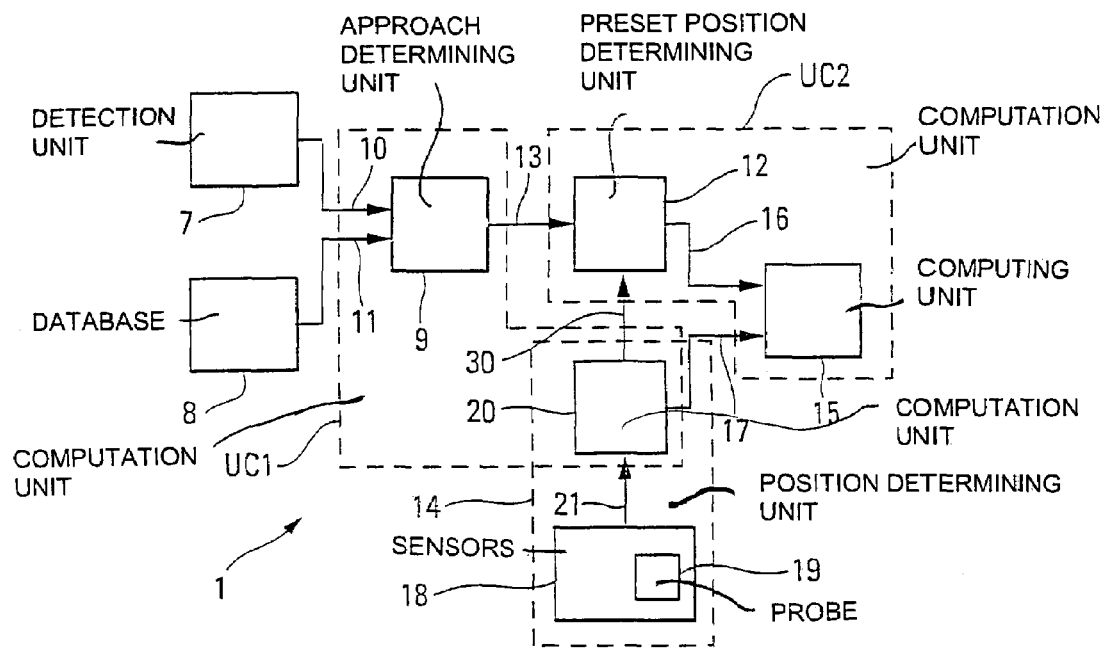
FIG. 1 is the schematic diagram of a device in accordance with the invention.
Figure 2:
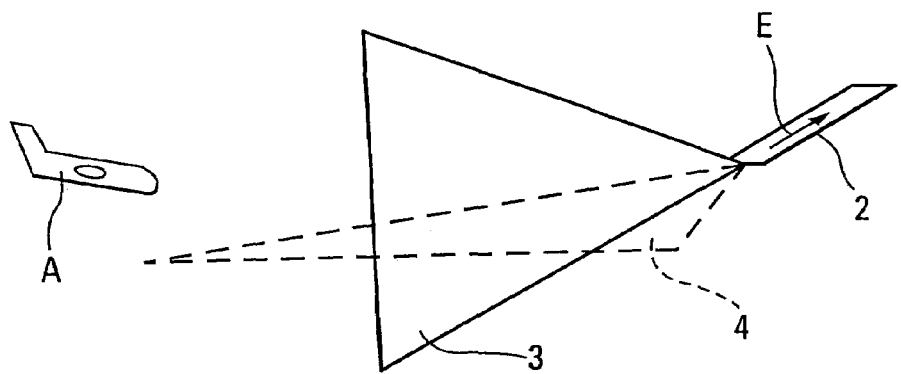
FIGS. 2 and 3 illustrate different cases of application of the present invention.

The device 1 in accordance with the invention and represented diagrammatically in FIG. 1 is intended for determining at least one cue of vertical position of an aircraft A, in particular of a civil transport plane, during landing thereof on a landing strip 2, in the presence of a lateral alignment beam 3 which is emitted from the ground and which gives an indication regarding the lateral alignment with respect to the landing strip 2 (FIG. 2).

This lateral alignment beam 3 is a "loc" beam which is generally emitted by a directional VHF radiotransmitter, generally placed on the axis of the strip 2 at the opposite end from the approach threshold, which ensures azimuthal guidance along the approach axis according to an ideal lateral alignment profile during an "ILS" approach, this radiotransmitter emitting in a known manner two signals with different modulation which overlap on the approach axis where the two signals are received with equal strength.

This radiotransmitter forms part of a standard radionavigation system which generally comprises, moreover, at least one radiotransmitter which is able to emit a "glide" beam 4 for vertical guidance, as represented by dashed lines in FIG. 2.

The present invention applies to the case where no "glide" beam 4 (vertical guidance) is available, only a "loc" beam 3 (lateral guidance) being detectable from the aircraft A.

Figure 3:
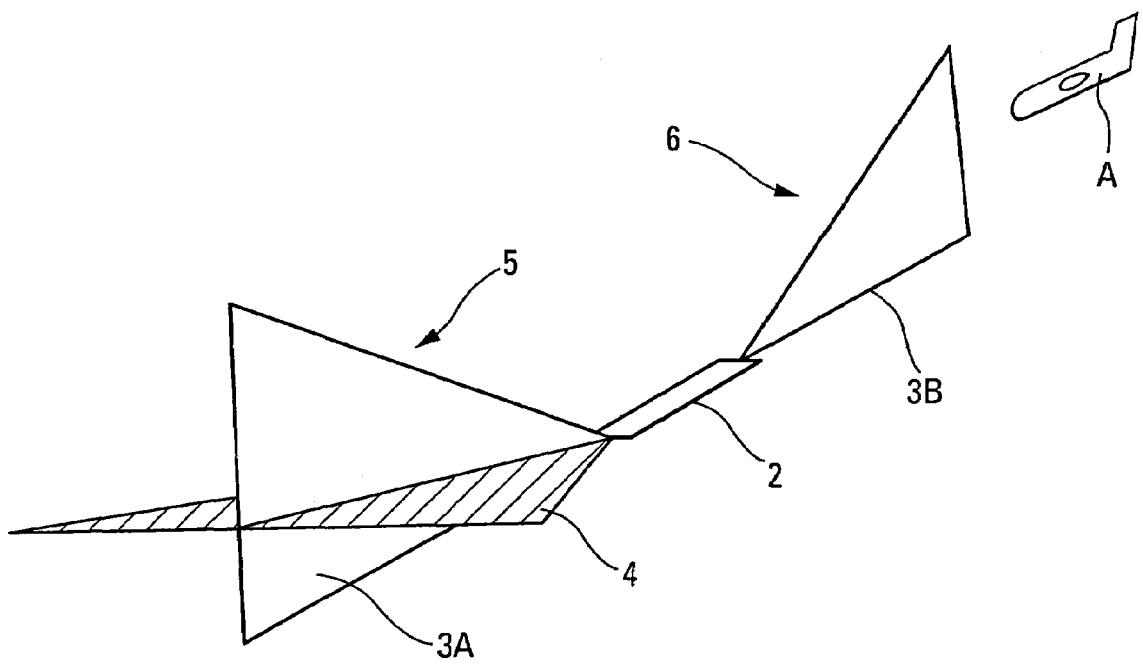

Such a case can occur in the following situations:

the radionavigation system comprises only means for emitting a "loc" beam 3 or the means of said radionavigation system which are intended to emit a "glide" beam are faulty, as represented in FIG. 2 (the absence of the "glide" beam 4 being depicted by dashed lines); or the radionavigation system emits a "glide" beam 4 forward 5 of the strip 2 and "loc" beams 3A and 3B respectively forward 5 and rearward 6 of the strip 2, and landing is carried out from the rear 6, as represented in FIG. 3.

To be able to obtain a cue of vertical position in such a case, said device 1 which is carried aboard the aircraft A comprises, according to the invention, as represented in FIG. 1:

a means of detection 7, namely a standard radioreceiver, for detecting said lateral alignment beam 3 (or 3B) from the aircraft A;

a database 8 which comprises cues specified hereinbelow, relating to landing on said landing strip 2;

a means 9 which is connected by links 10 and 11 respectively to the means of detection 7 and to the database 8 for determining an axis of approach of the aircraft A, on the basis of cues relating to said lateral alignment beam 3, that are received from said means of detection 7, and cues received from said database 8;

a means 14 for determining the actual position of the aircraft A;

a means 12 which is connected by a link 13 to the means 9, and by a link 30 to the means 14, for determining a preset position of the aircraft A, which corresponds to the position that the aircraft A would have if it were on said approach axis; and a means 15 which is connected by links 16 and 17 respectively to said means 12 and 14, for computing, on the basis of said actual position and of said preset position of the aircraft A, the vertical deviation of the aircraft, representing said vertical position cue.

Thus, by virtue of said device 1 in accordance with the invention, a cue of vertical position of the aircraft (vertical deviation with respect to the prescribed position) is obtained solely on the basis of a lateral alignment beam 3 ("loc" beam), that is to say without using a vertical guidance beam 4 ("glide" beam).

According to the invention:

the database 8 contains at least the following cues: the coordinates of a reference point situated on the threshold of the strip 2 or in immediate proximity to the threshold, as well as a slope or a rate of descent;

the means 9 determines the approach axis on the basis of these cues.

To do this, said means 9:

α) forms a set of first axes all passing through said reference point and all exhibiting said slope (or rate of descent); and β) chooses as approach axis a first axis of said set of first axes, whose projection onto a horizontal plane is parallel to the projection onto this horizontal plane of said lateral alignment beam 3 detected by the means of detection 7; and the means 14 determines the actual position of the aircraft, on the basis of values of longitude, of latitude and of altitude of the aircraft.

To do this, said means 14 preferably comprises:

a set 18 of sensors, for example an inertial platform and/or a GPS ("Global Positioning System") reception device for determining the values of latitude and of longitude of the aircraft A and at least one barometric probe 19 for carrying out an altitude measurement; and a means of computation 20 which is connected by a link 21 to said set 18 of sensors, for computing the actual position of the aircraft A on the basis of the values measured by said set 18 of sensors.

In a preferred embodiment:

the means 9 and 20 form part of one and the same computation unit UC1, for example a flight management computer, preferably of "FMS" ("Flight Management System") type; and the means 12 and 15 form part of one and the same computation unit UC2, for example a landing aid multimode receiver, preferably of "MMR" ("Multi-Mode Receiver") type.

In a preferred embodiment, to determine the preset position of the aircraft A on the approach axis, one proceeds in the following manner. A first point corresponding to the aircraft's actual position (same latitude and longitude) determined by the means 14 is considered, in a horizontal plane. A straight line corresponding to the vertical projection, in this horizontal plane, of the approach axis determined by the means 9 is considered. A second point in this horizontal plane corresponding to the orthogonal projection of said first point onto this straight line is determined and a vertical plane orthogonal to this straight line and containing said second point is considered. The preset position of the aircraft on the approach axis corresponds to the intersection of this approach axis with this vertical plane.

Of course, a preferred but nonexclusive application of the device 1 in accordance with the invention relates to the guidance of an aircraft A during landing thereof.

Figure 4:
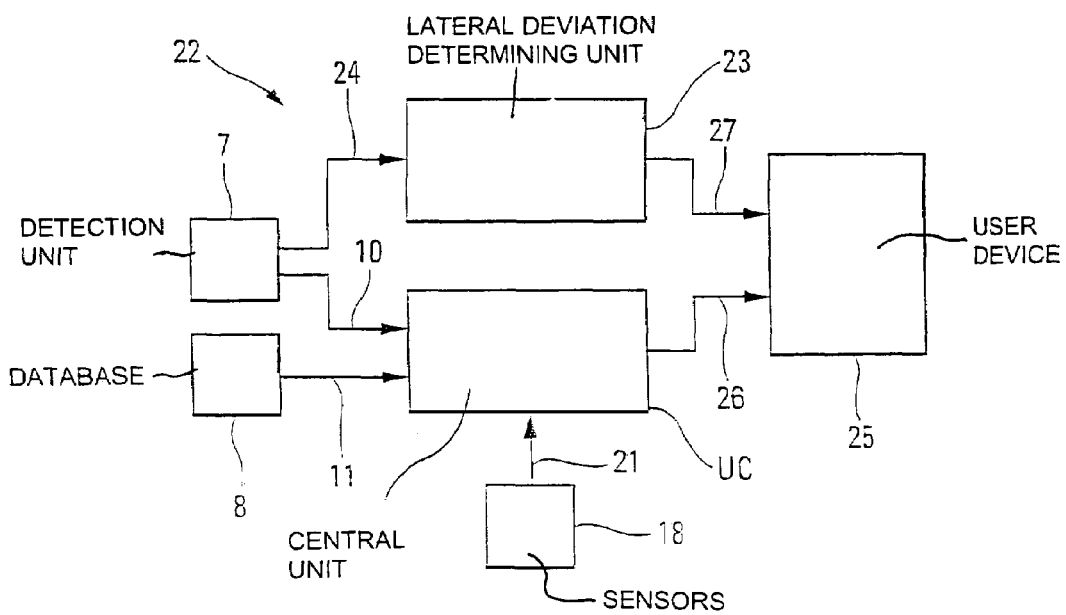
FIG. 4 is the schematic diagram of a preferred application in accordance with the invention.

In this case, said device 1 forms part of a guidance device 22 which moreover comprises, as represented in FIG. 4:

a standard means 23 which is connected by a link 24 to the means of detection 7 and which determines, in a standard manner, the lateral deviation of the aircraft A with respect to said lateral alignment beam 3 detected by said means of detection 7; and a user device 25 which receives said vertical and lateral deviations respectively from said device 1 and from said means 23 by way of links 26 and 27. For reasons of simplification of the drawing, the computation units UC1 and UC2 have been represented in FIG. 4 in the form of a central unit UC grouping together these two computation units UC1 and UC2. Said user device 25 makes it possible to carry out the guidance of the aircraft A during landing.

Within the framework of the present invention, this guidance which consists in canceling out said vertical and lateral deviations may for example be similar to that performed in the case where the aircraft makes a standard "ILS" precision approach. According to a first embodiment, this guidance may be carried out by means of an automatic pilot of the aircraft A. According to a second embodiment, this guidance may be carried out by the pilot who is furnished with a so-called "flight director" indicator on a screen of the aircraft [for example a primary flight display "PFD"]. According to another embodiment, the pilot is furnished only with said lateral and vertical deviations with the aid of an appropriate means of information (for example a screen) and he corrects the trajectory of the aircraft A (by piloting the latter) in such a way as to cancel out these deviations.

Consequently, the user device 25 may therefore be, in particular, an automatic pilot, a screen or another standard means of information.

The guidance device 22 in accordance with the invention therefore makes it possible to perform guidance of the aircraft A in an aircraft approach phase and during landing, in a manner similar to guidance carried out during an "ILS" precision approach, in the particular and difficult case considered in the present invention (absence of "glide" beam). This makes it possible to reduce the pilot's workload, improves the ergonomics since the user interface is similar to that used for an "ILS" approach, and affords enhanced flight safety.

The guidance device 22 in accordance with the invention therefore affords an essential aid to landing, in particular through poor visibility (fog, etc.) or in the absence of visibility.

Various characteristics of the device 1 in accordance with the invention are specified hereinbelow.

In a preferred embodiment of the invention, the means of computation 20 corrects the altitude value measured by the barometric probe 19, as a function of the temperature on the ground.

To do this, said means of computation 20 corrects the altitude value Am measured, with the aid of the following expression, to obtain a corrected altitude value Ac:

$$Ac=(Am-Ap).(T1/T2)+Ap$$

in which:
Ap represents the altitude of the landing strip 2 of the airport (as published on approach maps and stored in a database);
T1 is the temperature on the ground; and
T2 is a predetermined temperature value.

In a first variant of this preferred embodiment, the value of the temperature T1 measured on the airport is communicated verbally to the pilot (by radio link with the airport's control tower) and the pilot enters this value into a computer (computation unit UC1 for example) of the aircraft A by means of an appropriate input device (not represented), for example an interface of "MCDU" ("Multipurpose Control Display Unit") type. In a second variant, this value of the temperature T1 measured on the airport is transmitted to a computer (computation unit UC1 for example) of the aircraft A by means of a digital datalink (not represented), for example a radio link, between the air traffic control and the aircraft A. Preferably, the altitude correction according to the aforesaid expression is carried out only if the temperature on the ground T1 is below a predetermined temperature value, in particular the value T2.

This preferred embodiment has the advantage of automatically correcting the altitude of the aircraft A as a function of the temperature during guidance of this aircraft along an approach axis, whereas at present pilots have to correct this altitude using charts, in particular when they land on airports where the temperature is particularly low.

In another embodiment (which may be combined with the preferred embodiment described hereinabove for providing the altitude value Am used in the altitude correction formula corresponding to said preferred embodiment), the aircraft's altitude used for the computation of said vertical deviation is corrected (if necessary) so as to be referenced with respect to the level 28 of the sea 29 (so-called QNH altitude).

Figure 5:
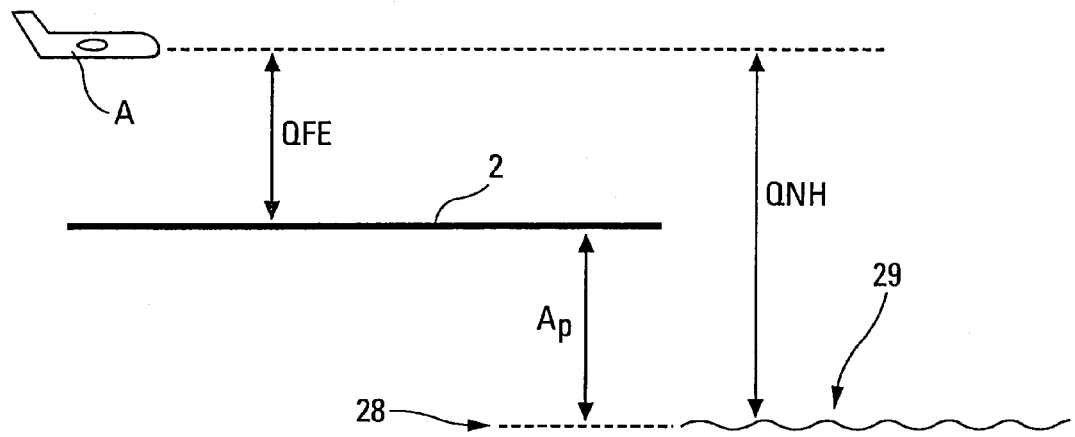
FIGS. 5 and 6 diagrammatically show two different situations of implementation of the present invention.
Figure 6:
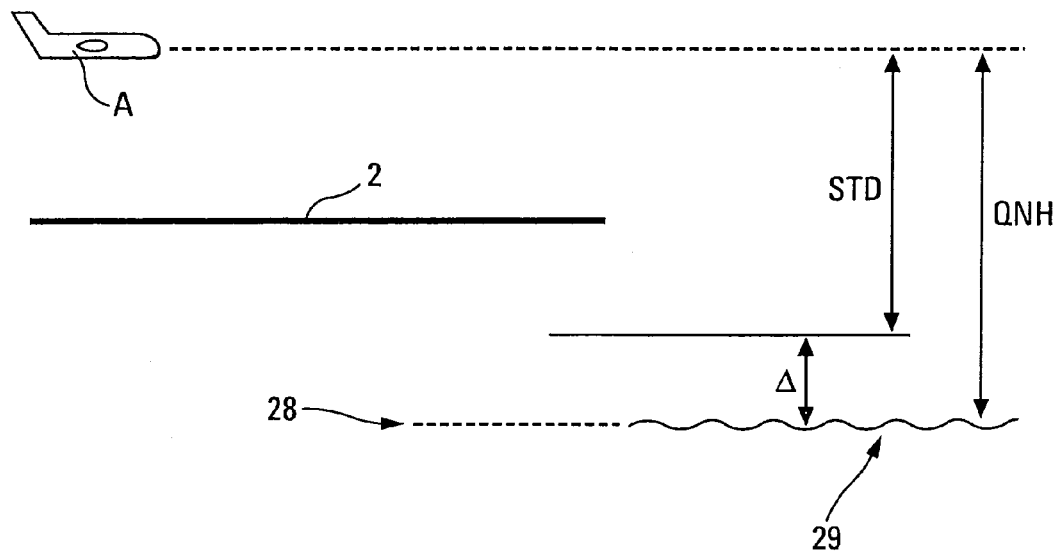

Such a correction is carried out in particular in two cases:
the measured altitude is referenced with respect to the strip 2 of the airport (so-called QFE altitude). The altitude Ap of the strip 2 with respect to the level 28 of the sea 29 being known (FIG. 5) and available, in a known manner, in a database carried aboard the aircraft, the altitude QNH is computed with the aid of the following expression:

$$QNH=QFE+Ap$$

the measured altitude is a so-called standard altitude (STD), that is to say an altitude which corresponds to a departure of the pressure measured by sensors of the aircraft A from a reference pressure equal to 1013 HPa.
In a known manner, the corrected altitude QNH is then computed with the aid of the following expression (FIG. 6):

$$QNH=STD+\Delta \text{ with } \Delta=QNHp-\beta,$$

QNHp being a value dependent on the atmospheric pressure at the level of the landing strip 2 and β being a predetermined value.

In a first variant of this last embodiment, the value QNHp is communicated verbally to the pilot (for example by radio link with the airport's control tower) and the pilot enters this value into a computer (computation unit UC1 for example) of the aircraft A by means of an appropriate input device, for example an interface of "MCDU" type. In a second variant, this value is transmitted to a computer (computation unit UC1 for example) of the aircraft A by means of a digital datalink (not represented), for example a radio link, between the air traffic control and the aircraft A.

This embodiment has the advantage of using a single altitude reference whatever reference is chosen by the pilot. This facilitates guidance of the aircraft A. Specifically, guidance is generally performed with respect to waypoints, whose altitude (QNH) indicated on the approach maps is referenced with respect to the level 28 of the sea 29. Moreover, generally, the altitude of the reference point used for the determination of the approach axis is, itself, referenced with respect to the level 28 of the sea 29.

The invention claimed is:

1. A method of determining at least one cue of vertical position of an aircraft during landing thereof on a landing strip, in the presence of a lateral alignment beam which is emitted from the ground and which gives an indication regarding the lateral alignment with respect to the landing strip, wherein:
   a) said lateral alignment beam is detected on the aircraft;
   b) on the basis of cues relating to said lateral alignment beam thus detected and of predetermined cues, an axis of approach of the aircraft is determined;
   c) the actual position of the aircraft is determined;
   d) a preset position of the aircraft is determined, which corresponds to the position that the aircraft would have if it were on said approach axis; and
   e) on the basis of said actual position and of said preset position of the aircraft, the vertical deviation of the aircraft, which represents said vertical position cue, is computed.

2. The method as claimed in claim 1, wherein, in step b), to determine said approach axis:
   a set of first axes all passing through one and the same predetermined point situated on the ground at least in proximity to said landing strip and all exhibiting one and the same predetermined slope is formed; and
   a first axis of said set of first axes, whose projection onto a horizontal plane is parallel to the projection onto this horizontal plane of said detected lateral alignment beam, is chosen as the approach axis.

3. The method as claimed in claim 1, wherein, in step c), the actual position of the aircraft is determined on the basis of values of longitude, of latitude and of altitude of the aircraft.

4. The method as claimed in claim 3, wherein the value of altitude of the aircraft is obtained with the aid of at least one measurement carried out by at least one barometric probe.

5. The method as claimed in claim 3, wherein the altitude value, which is measured, is corrected as a function of the temperature on the ground.

6. The method as claimed in claim 5, wherein the measured altitude value Am is corrected with the aid of the following expression, to obtain a corrected altitude value Ac:

$$Ac=(Am-Ap).(T1/T2)+Ap$$

in which:
Ap represents the altitude of the landing strip;
T1 is the temperature on the ground; and
T2 is a predetermined temperature value.

7. The method as claimed in claim 5, wherein the altitude value is corrected only if the temperature on the ground is less than a predetermined temperature value.

8. The method as claimed in claim 3, wherein the altitude value, which is measured, is corrected in such a way as to obtain a corrected altitude value QNH which is referenced with respect to the level of the sea.

9. The method as claimed in claim 8, wherein, when the measured altitude value QFE is referenced with respect to the landing strip, it is corrected with the aid of the following expression to obtain the corrected altitude value QNH:

$$QNH = QFE + Ap,$$

in which Ap represents the altitude of the landing strip.

10. The method as claimed in claim 8, wherein, when the measured altitude value is a standard altitude STD, it is corrected with the aid of the following expression to obtain the corrected altitude value QNH:

$$QNH = STD + \Delta \text{ with } \Delta = QNHp - \beta,$$

QNHp being a value dependent on the atmospheric pressure at the level of the landing strip and $\beta$ being a predetermined value.

11. A method of guiding an aircraft during landing thereof on a landing strip, in the presence of a lateral alignment beam which is emitted from the ground and which gives an indication regarding the lateral alignment with respect to the landing strip, wherein the following series of successive operations is carried out repetitively up to landing:
the method specified under claim 1 is implemented to determine the vertical deviation of the aircraft;
the lateral deviation of the aircraft with respect to said detected lateral alignment beam is determined; and
the aircraft is guided in such a way as to cancel out said vertical and lateral deviations.

12. A device for determining at least one cue of vertical position of an aircraft during landing thereof on a landing strip, in the presence of a lateral alignment beam which is emitted from the ground and which gives an indication regarding the lateral alignment with respect to the landing strip, which comprises:
a detection section that detects said lateral alignment beam on the aircraft;
a database comprising cues relating to landing on said landing strip;
a first section that determines an axis of approach of the aircraft, on the basis of cues relating to said lateral alignment beam that are received from said detection section, and cues received from said database;
a second section that determines the actual position of the aircraft;
a third section that determines a preset position of the aircraft, which corresponds to the position that the aircraft would have if it were on said approach axis; and
a fourth section that computes, on the basis of said actual position and of said preset position of the aircraft (A), the vertical deviation of the aircraft, representing said vertical position cue.

13. The device as claimed in claim 12, wherein said first and second sections form part of one and the same computation unit.

14. The device as claimed in claim 12, wherein said third and fourth sections form part of one and the same computation unit.

15. The method of claim 1, wherein the method is implemented by a device on the aircraft.

* * * * *